United States Patent
Choi et al.

(10) Patent No.: US 10,249,051 B2
(45) Date of Patent: Apr. 2, 2019

(54) DEPTH EXTRACTING CAMERA SYSTEM USING MULTI FOCUS IMAGE AND OPERATION METHOD THEREOF

(71) Applicant: CENTER FOR INTEGRATED SMART SENSORS FOUNDATION, Daejeon (KR)

(72) Inventors: Sang Gil Choi, Daejeon (KR); Junho Mun, Daejeon (KR); Dongsuk Kim, Daejeon (KR); Chong Min Kyung, Daejeon (KR)

(73) Assignee: CENTER FOR INTEGRATED SMART SENSORS FOUNDATION, Daejeon (KR)

( * ) Notice: Subject to any disclaimer, the term of this patent is extended or adjusted under 35 U.S.C. 154(b) by 12 days.

(21) Appl. No.: 15/605,115

(22) Filed: May 25, 2017

(65) Prior Publication Data

US 2017/0345176 A1 Nov. 30, 2017

(30) Foreign Application Priority Data

May 25, 2016 (KR) .................. 10-2016-0064147

(51) Int. Cl.
*G06T 7/571* (2017.01)
*G02B 5/09* (2006.01)

(52) U.S. Cl.
CPC .............. *G06T 7/571* (2017.01); *G02B 5/09* (2013.01); *G06T 2207/10148* (2013.01)

(58) Field of Classification Search
CPC ................................................ G06T 7/571
See application file for complete search history.

(56) References Cited

U.S. PATENT DOCUMENTS

| 8,184,196 B2* | 5/2012 | Forutanpour | G06T 7/571 348/239 |
|---|---|---|---|
| 8,432,479 B2* | 4/2013 | Kane | G02B 27/0075 348/252 |
| 10,007,109 B2* | 6/2018 | Abolbashari | G02B 27/005 |
| 10,015,469 B2* | 7/2018 | Campbell | G06T 5/002 |
| 2010/0033617 A1* | 2/2010 | Forutanpour | G06T 7/564 348/345 |
| 2010/0194870 A1* | 8/2010 | Ghita | G01B 11/22 348/65 |
| 2012/0027393 A1* | 2/2012 | Tsuda | H04N 5/23212 396/102 |
| 2012/0319945 A1* | 12/2012 | McCarthy | G06F 3/017 345/156 |
| 2013/0223759 A1* | 8/2013 | Nishiyama | G06T 5/50 382/284 |

(Continued)

FOREIGN PATENT DOCUMENTS

| KR | 2015-0089256 A | 8/2015 |
|---|---|---|
| KR | 2016-0005984 A | 1/2016 |

*Primary Examiner* — Anand P Bhatnagar
(74) *Attorney, Agent, or Firm* — McCormick, Paulding & Huber LLP

(57) ABSTRACT

An operation method of depth extracting camera system using multi focus image includes acquiring at least two or more images having different focused subject distances— each of the at least two or more images including a subject— through a single optical system which is included in the depth extracting camera system; and extracting depth for the subject by using a blur difference in the at least two or more images.

2 Claims, 8 Drawing Sheets

(56) References Cited

U.S. PATENT DOCUMENTS

| | | | |
|---|---|---|---|
| 2014/0184748 A1* | 7/2014 | Gharib | G02B 3/0056 348/46 |
| 2016/0042522 A1* | 2/2016 | Wajs | H04N 5/2254 348/335 |
| 2016/0148387 A1* | 5/2016 | Kitago | G06T 7/557 382/106 |
| 2016/0267670 A1* | 9/2016 | Sun | G06T 7/571 |

* cited by examiner

400

DEPTH EXTRACTING CAMERA SYSTEM USING MULTI FOCUS IMAGE AND OPERATION METHOD THEREOF

This application claims the priority benefit of Korean Patent Application No. 10-2016-0064147, filed on May 25, 2016, in the Korean Intellectual Property Office, the disclosure of which is incorporated herein by reference.

BACKGROUND

1. Field of the Invention

The following example embodiments relate to a depth extracting camera using multi focus image and an operation method of the depth extracting camera system using multi focus image, and more particularly, to technology extracting depth for a subject by using at least two or more images having different focused subject distances.

2. Description of the Related Art

An existing technology of extracting depth for a subject is classified into an active type and a passive type depending on whether a subject is irradiated with light.

The active type depth extracting methods are a TOF (Time of flight) method measuring the time the light returning after irradiating a laser to a subject, a triangulation-based method using the reach to other position of a sensor depending on the depth of the laser irradiated to a subject, a white light method extracting depth by examining line or grid pattern on a subject and identifying modified form, and a structured light method extracting depth information with the triangulation-based method by irradiating structured light encoded with information and identifying the structured light by sensor.

Although a camera system using such the active type depth extracting methods shows high accuracy, there are disadvantages in that the manufacturing cost is high, the use is restricted outdoors, the use distance is limited, and the structure is difficult to miniaturize.

The passive type depth extracting methods are typically a depth from stereo method extracting depth from parallax between images acquired from at least two or more camera devices, a structure from motion method extracting depth from motion parallax between a plurality of images acquiring from one camera system, and a method extracting depth based on a blur size change between two images acquired based on different optical signals.

Such the passive type depth extracting methods are considered as a computer vision field, and there are limitations in the processing speed and accuracy. However, because the limitation in the use environment is low and the manufacture cost is low, it may be used in various fields.

Especially, among the passive type depth extracting methods, the method extracting depth based on a blur size change has a great advantage that there is no image to image occlusion problem which is pointed out as the biggest problem in the depth from stereo method and the structure from motion method.

However, the existing method of extracting depth based on a blur size change has disadvantages that in the process acquiring two images, two apertures are required and due to using two images acquired based on different optical signals the accuracy of extracted depth is limited.

Accordingly, the following example embodiments propose a technology extracting depth for a subject by using at least two or more images having different focused subject distances for overcoming the disadvantages of the existing depth extracting method.

SUMMARY

At least one example embodiment provides a depth extracting camera system using a blur difference in at least two or more images having different focused subject distances through a single optical system and an operation method of the depth extracting camera system.

At least one example embodiment provides a depth extracting camera system acquiring at least two or more images having different focused subject distances and an operation method of the depth extracting camera system by having a single optical system consisting of MALS (Micro-mirror Array Lens System) or a single optical system moved to a plurality of positions.

At least one example embodiment also provides a depth extracting camera system matching the sizes of at least two or more images having different focused subject distances and an operation method of the depth extracting camera system by performing software image processing in order to using at least two or more images having different focused subject distances in the depth extracting process.

At least one example embodiment also provides a depth extracting camera system extracting accurate depth and an operation method of the depth extracting camera system by setting a focused subject distance of each of at least two or more images having different focused subject distances within a defined range.

According to an aspect of at least one example embodiment, an operation method of the depth extracting camera system using multi focus image includes acquiring at least two or more images having different focused subject distances—each of the at least two or more images including a subject—through a single optical system which is included in the depth extracting camera system; and extracting depth for the subject by using a blur difference in the at least two or more images.

The acquiring at least two or more images having different focused subject distances may include simultaneously acquiring the at least two or more images having different focused subject distances by using the single optical system consisting of MALS (Micro-mirror Array Lens System).

The acquiring at least two or more images having different focused subject distances may include acquiring the at least two or more images having different focused subject distances by using the single optical system moved to a plurality of positions.

The extracting depth for the subject by using a blur difference in the at least two or more images may include matching the sizes of the at least two or more images; and extracting depth for the subject by using a blur difference in the at least two or more images of which the size is matched.

The matching the sizes of the at least two or more images may include constructing statistics of image size interpolation in advance; and matching the sizes of the at least two or more images based on the statistics of image size interpolation.

The constructing statistics of image size interpolation in advance may include acquiring two sample images having different subject distance—each of the two sample images including specific pattern, for example, a dot pattern-through the single optical system; and constructing statistics of the image size interpolation in advance based on the distance between dot patterns in each of the two sample images.

The matching the sizes of the at least two or more images may include extracting at least one patch from each of the at least two or more images; and matching the sizes of the at least two or more images based on a position shift value of the at least one patch between the at least two or more images.

The extracting depth for the subject by using a blur difference in the at least two or more images may include extracting depth for the subject by using a depth extraction algorithm which calculates depth based on the rate of blur difference in the at least two or more images.

The operation method may further include defining a focus range based on the extracted depth for the subject; acquiring at least two or more fine images having different focused subject distances—each of the at least two or more fine images including a subject—within the defined focus range; and extracting the depth for the subject by using a blur difference in the at least two or more fine images.

The extracting the depth for the subject by using a blur difference in the at least two or more images may include selecting two images based on a correlation of the at least two or more images; and extracting the depth for the subject by using a blur difference in the selected two images.

The extracting the depth for the subject by using a blur difference in the at least two or more images may include creating two images by combining the at least two or more images; and extracting depth for the subject by using a blur difference in the created two images.

According to at least one example embodiment, a depth extracting camera system using multi focus image may include a single optical system; an image sensor acquiring at least two or more images having different focused subject distances—each of the at least two or more images including a subject-through the single optical system; and a depth extracting unit extracting depth for the subject by using a blur difference in the at least two or more images.

The single optical system may be configured to consist of MALS (Micro-mirror Array Lens System), and the image sensor may be configured to acquire simultaneously the at least two or more images having the different focused subject distances by using the single optical system consisting of MALS.

The depth extracting unit may be configured to match the size of the at least of two or more images and extract depth of the subject by using a blur difference in the at least two or more images of which the size is matched.

According to example embodiments, there may be provided a depth extracting camera system using a blur difference in at least two or more images having different focused subject distances through a single optical system, and an operation method of the depth extracting camera system.

Also, according to example embodiments, there may be provided a depth extracting camera system reducing the complexity of depth extracting calculation and improving the accuracy of depth extracting by using a blur distance in the at least of two or more images having different subject distances acquired through a single optical system, and an operation method of the depth extracting camera system.

Also, according to example embodiments, there may be provided a depth extracting camera system acquiring at least two or more images having different focused subject distances by having a single optical system consisting of MALS or moved to a plurality of positions, and an operation method of the depth extracting camera system.

Also, according to example embodiments, there may be provided a depth extracting camera system matching the sizes of at least of two or more images having different focused subject distances by performing software image processing in order to using the at least two or more images having different focused subject distances in the depth extracting process, and an operation method of the depth extracting camera system.

Also, according to example embodiments, there may be provided a depth extracting camera system having low manufacturing cost compared to a technology matching the sizes of at least two or more images through hardware structure, and an operation method of the depth extracting camera system.

Also, according to example embodiments, there may be provided a depth extracting camera system extracting accurate depth by setting a focused subject distance of each of at least two or more images having different focused subject distances in a defined focus range, and an operation method of the depth extracting camera system.

BRIEF DESCRIPTION OF THE DRAWING

These and/or other aspects, features, and advantages of the invention will become apparent and more readily appreciated from the following description of embodiments, taken in conjunction with the accompanying drawings of which.

DETAILED DESCRIPTION

Figure 1:
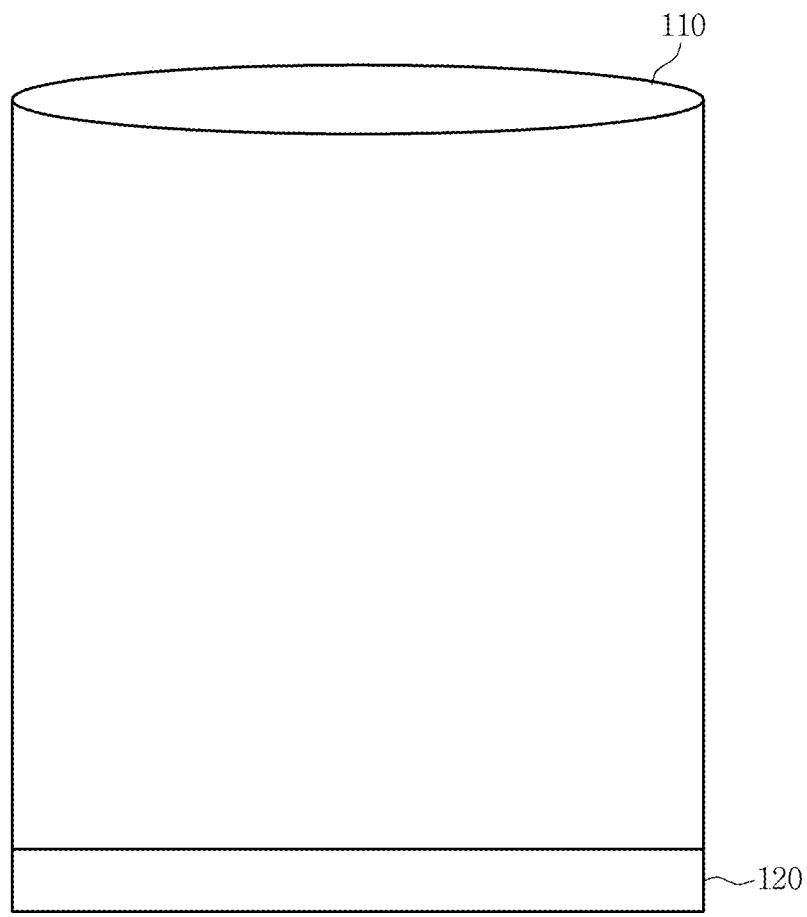
FIG. 1 illustrates a depth extracting camera system according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Also, terminologies used herein refer to terms used to appropriately represent the example embodiments and may vary based on a reader, the intent of an operator, or custom of a field to which this disclosure belongs, and the like. Accordingly, the definition of the terms should be made based on the overall description of the present specification.

FIG. 1 illustrates a depth extracting camera system according to an example embodiment.

Referring to FIG. 1, the depth extracting camera system 100 includes a single optical system 110, an image sensor 120, and a depth extracting unit (not illustrated in the FIG.). Hereinafter, a case that the depth extracting unit is included in the image sensor 120 is described. However, the depth extracting unit is not limited or defined to thereto, and may be provided as a separate module different from the image sensor 120.

The single optical system 110 includes a lens inflowing optical signals of arbitrary wavelength band. In particular, the single optical system 110 may have a physical structure supporting to acquire at least two or more images having different focused subject distances in the image sensor 120.

For example, as the single optical system 110 consists of MALS (Micro-mirror Arrau Lens System), the single optical system may support to simultaneously acquire at least two or more images having different focused subject distances in the image sensor 120 depending on the operation of MALS. As another example, because the single optical system 110 is configured to include an actuator, the single optical system may be moved to a plurality of positions and may support to acquire at least two or more images having different focused subject distances in the image sensor 120 by inflowing optical signals at each of the plurality of positions. A further description related thereto will be made with reference to FIGS. 3 and 4.

The image sensor 120 processes the inflowing optical signals through the single optical system 110 and acquires at least two or more images including a subject. Here, the at least two or more images are acquired to have different focused subject distances.

For example, the image sensor 120 may process the inflowing optical signals through the single optical system 110 and may acquire the first image having a far focused subject distance (a far focused subject distance on the basis of a depth extracting system 100) and the second image having a close focused subject distance (a close focused subject distance on the basis of a depth extracting system 100). This is because the minimum number of images having different focused subject distances required on a depth extracting process of the depth extracting unit described below must be at least two or more. Accordingly, hereinafter, a case that the image sensor 120 acquires two images having different focused subject distance is described. However, the image sensor is not limited or defined to thereto, and the images having different focused subject distances may be three, four, or more.

Also, each of the far focused subject distance and the close focused subject distance may be adaptively set based on a difference of focused subject distances of images required on the depth extracting process of the depth extracting unit described below. For example, each of the focused subject distances of the first image and the second image may be set to have a difference between the focused subject distances proper to extracting depth from the depth extracting unit.

Also, the optical signals inflowing by the single optical system 110 may be various wavelength bands (for example, visible light wavelength band or infrared light wavelength band), and the image sensor 120 may be created to process optical signals of the various wavelength bands inflowing by the single optical system 110. For example, the image sensor 120 may consist of RGB (Red, Green, Blue) pixel or RGB pixel and IR (Infrared) pixel.

The depth extracting unit extracts depth for a subject by using a blur difference of the first image and the second image having different focused subject distances acquired in the image sensor 120. Here, the depth extracting unit may extract depth for the subject by using the existing depth extracting algorithm extracting depth corresponding to blur size change in the first image and the second image based on PSF (Point Spread Function) and also by using a depth extracting algorithm (for example, Shape from Focus algorithm) directly calculating depth based on the rate of blur difference in the at least two or more images having different focused subject distances. A detailed description related thereto will be omitted because it is beyond the technical idea of the present invention.

Here, the first image and the second image having different focused subject distances used on the depth extracting process of the depth extracting unit may have different sizes because the optic signals inflowing according to the physical structure of the single optical system 110 are processed in the image sensor 120 and acquired. Accordingly, as the depth extracting unit additionally performs size matching for the first image and the second image having different focused subject distances, the depth extracting unit may extract depth for a subject by using a blur difference in the sized matched first image and second image.

For example, the depth extracting unit may match the sizes of the first image and the second image having different focused subject distances based on the pre-constructed statistics of image size interpolation. A further description related thereto will be made with reference to FIG. 5.

As another example, after the depth extracting unit extracts at least one patch from each of the first image and the second image having different focused subject distances, the depth extracting unit may match the sizes of the first image and the second image based on a position shift value of the at least one patch in the first image and the second image. A further description related thereto will be made with reference to FIG. 6.

Also, as described above, the depth extracting unit may extract more accurate depth by repeatedly performing the process extracting depth for the subject by using a blur difference in the first image having a far focused subject distance and the second image having a close focused subject. Here, the depth extracting unit may define a focused subject distance of each of images used in the present depth extracting process based on the extracted depth on the previous depth extracting process.

For example, if the image sensor 120 acquires the first image and the second image having different roughly focused subject distances (for example, the first image having a far subject distance that is close to infinity and the second image having a focused subject distance that is very close to the depth extracting camera system 100) through the single optical system 110, the depth extracting unit extracts rough depth for the subject by using a blur difference in the first image and the second image having different roughly focused subject distances and defines a focus range based on the rough depth. Then, the depth extracting unit may make the image sensor 120 acquire the fine first image and second image having different focused subject distances in the defined focus range (for example, the fine first image having a farthest focused subject distance in the pre-defined range based on the rough depth and the fine second image having a closest focused subject distance in the pre-defined range based on the rough depth). Accordingly, the depth extracting unit may extract more accurate depth for the subject by using a blur difference in the fine first image and second image.

Also, the depth extracting unit, on the depth extracting process, may further use additional images acquired in the image sensor 120 as well as use the first image having a far focused subject distance and the second image having the close focused subject distance acquired in the image sensor 120.

For example, if the image sensor 120 acquires three or more images (for example, the first image having a farthest focused subject distance, the second image having a closest focused subject distance, and the third image having a middle focused subject distance), the depth extracting unit may select any two images among the three or more images and may extract depth for the subject by using a blur difference in the selected two images.

Here, the depth extracting unit may select any two images having the highest correlation based on the correlation of the three or more images, or may select two images having a proper blur difference value for depth extracting among the three or more images.

As another example, if the image sensor 120 acquires three or more images, the depth extracting unit may create two new images by combining the three or more images and may extract depth for the subject by using a blur difference in the two created images.

As described above, the depth extracting unit may extract accurate depth for the subject by using a blur difference in at least two or more images having different focused subject distances. Accordingly, the depth extracting unit may extract depth for the subject for each of a plurality of frames and may complete a depth map including depth for the subject of each frame. A further description related thereto will be made with reference to FIG. 2.

Figure 2:
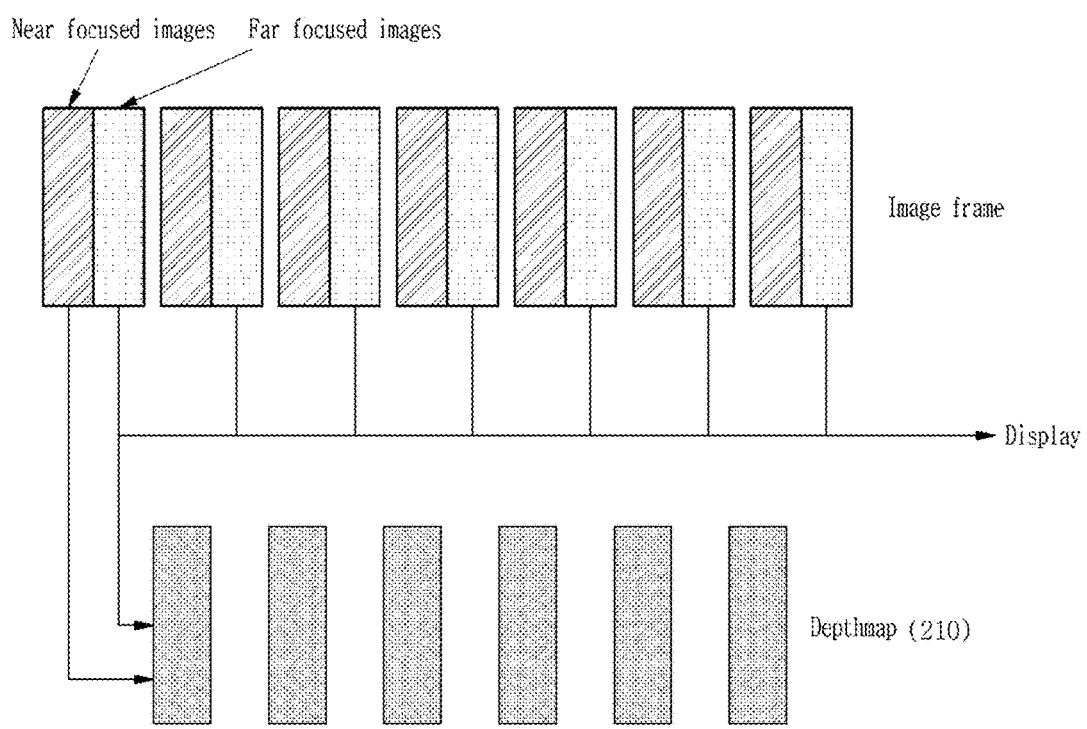
FIG. 2 is illustrates a depth map creation process of a depth extracting camera system according to an example embodiment.

FIG. 2 illustrates a depth map creation process of a depth extracting camera system according to an example embodiment.

Referring to FIG. 2, the depth extracting camera system performs the described depth extracting process referring to FIG. 1 for each of a plurality of frames, and may complete a depth map 210 including depth for the subject of each frame.

For example, as the depth extracting camera system is configured that the image acquiring speed for each frame is set at twice the speed of the existing camera system, after the system repeatedly performs a process acquiring the 1-1 image and the 1-2 image having the different focused subject distances in the first frame and acquiring the 2-1 image and the 2-2 image having the different subject distances in the second frame, the system may extract depth for the subject in each frame and complete the depth map 210 based on the extracted depth.

Figure 3:
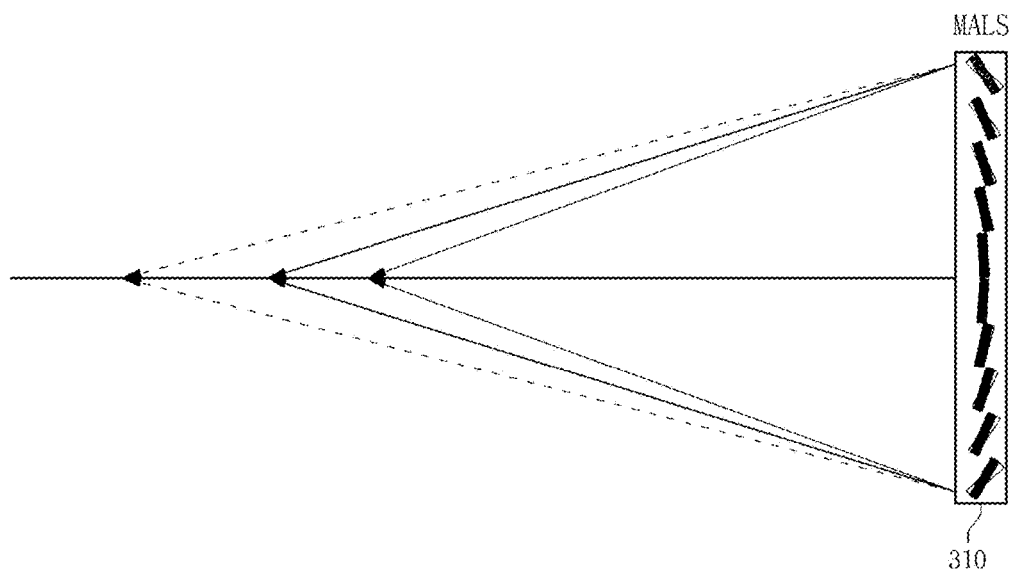
FIG. 3 illustrates a single optical system included in a depth extracting camera system according to an example embodiment.

FIG. 3 illustrates a single optical system including a depth extracting camera system according to an example embodiment.

Referring to FIG. 3, as the depth extracting camera system configures a single optical system 300 to consist of MALS 310, the system may simultaneously acquire at least two or more images having different focused subject distances through an image sensor depending on operation of MALS 310.

For example, the single optical system 300 is configured to include MALS 310 arranged on a lens (not described in the FIG.) and the lower part of the lens, and may have different focused subject distances by adaptively changing a reflection angle of each of inflowing optical signals from the lens depending on operations of a plurality of mirrors on inside of MALS 310 (for example, operations to change reflection angle of each of the optical signals, such as change of direction or change of position). Accordingly, if the inflowing optical signals through the single optical system 300 are processes in the image sensor, at least two or more images having different focused distances may be simultaneously acquired.

Here, in the case that the depth extracting camera system includes a splitter, the depth extracting camera system is configured in 'T' shape, and may arrange sequentially the lens, the MALS 310, and the image sensor at each end of the 'T' shape. If the splitter is not included in the depth extracting camera, the depth extracting camera is configured in '¬' shape and the lens, the MALS 310, and the image sensor may be sequentially arranged at each end of the '¬' shape. In this case, the MALS may lean at an angle of 45 degrees to the lens, and may be arranged.

As described above, although the case that MALS 310 is arranged between the lens and the image sensor is described, it is not limited or defined to thereto, and the MALS 310 may be arranged in the upper part of the lens.

Here, because the MALS 310 generates operations of the plurality of mirrors of inside at high speed, the inflowing optical signals depending on the operations of MALS 310 may be almost simultaneously processed in the image sensor. Accordingly, the depth extracting camera system including the single optical system 300 consisting of MALS 310 may simultaneously acquire at least two or more images having different focused subject distances.

Figure 4:
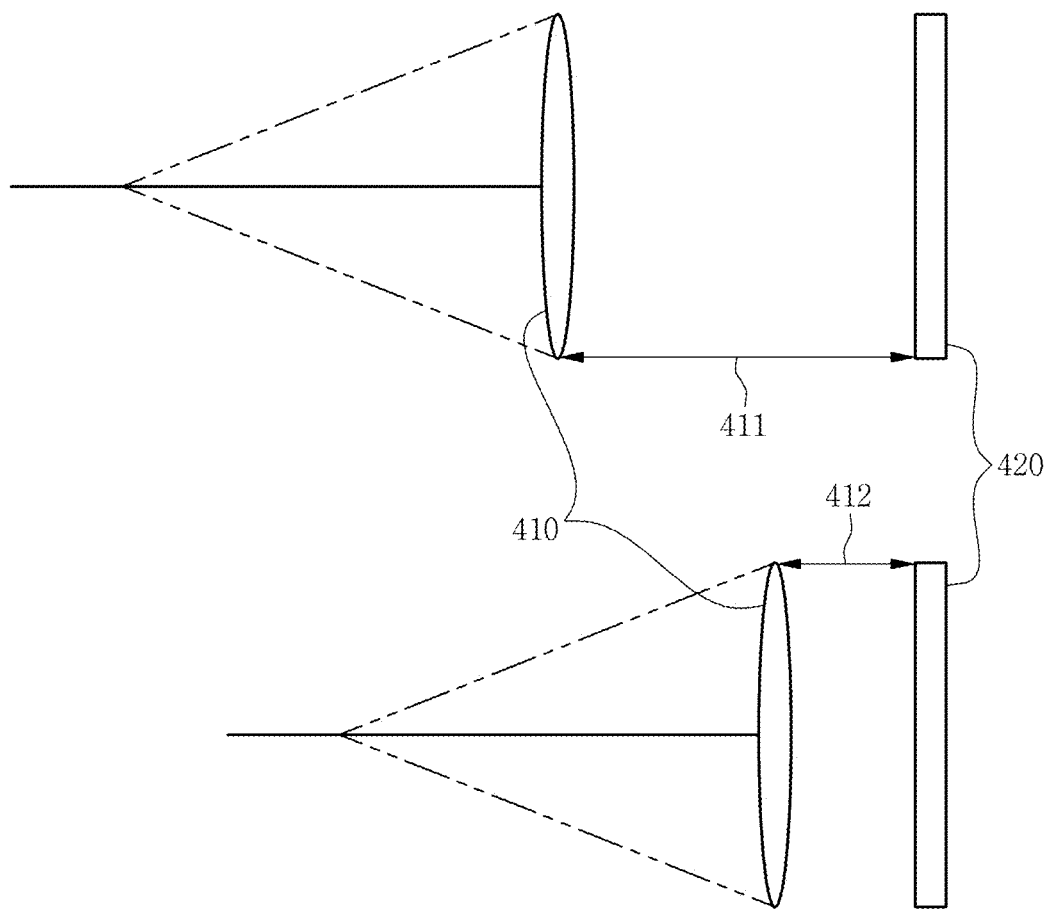
FIG. 4 illustrates a single optical system included in a depth extracting camera system according to other example embodiment.

FIG. 4 illustrates a single optical system including a depth extracting camera system according to other example embodiment.

Referring to FIG. 4, as the depth extracting camera system configures a single optical system 400 to be moved to a plurality of positions, the single optical system 400 is moved to the plurality of positions and processes inflowing optical signals from each of the plurality of positions through an image sensor 420. Accordingly, the depth extracting camera system may acquire at least two or more images having different focused subject distances. Hereinafter, the single optical system 400 being moved to the plurality of positions means being moved to far away position or close position from the image sensor 420 based on the image sensor 420.

For example, the single optical system 400 is configured to include a lens 410 and an actuator (as a component moving the lens 410 to the plurality of positions, not described on the FIG.) and may inflow the optical signals by moving the lens 410 to the plurality of positions depending on an operation of the actuator. Accordingly, if the inflowing optical signals by being moved the single optical system 400 to the plurality of positions are processes in the image sensor 420, at least two or more images having different focused subject distances may be acquired.

For more detailed example, if inflowing optical signals by moving the lens 410 included in the single optical system 400 to the first position 411 by the actuator are processes in the image sensor 420, the first image having a far focused subject distance may be acquired, and if inflowing optical signals by moving the lens 410 to the second position 412 by the actuator are processes in the image sensor 420, the second image having a close focused subject distance may be acquired.

Here, because the actuator moves the lens 410 to the plurality of positions at high speed, the inflowing optical signals through the single optical system 400 may be almost simultaneously processed in the image sensor 420. Accordingly, the depth extracting camera system including the single optical system 400 configured to be moved to the plurality of positions may simultaneously acquire at least two or more images having different focused subject distances.

Also, although the case that the single optical system 400 is moved to the plurality of positions is described, it is not limited or defined to thereto, and the image sensor 420 may be moved to the plurality of positions based on the optical system 400. In this case, the actuator may be provided with the image sensor 420 to move the image sensor 420.

Figure 5:
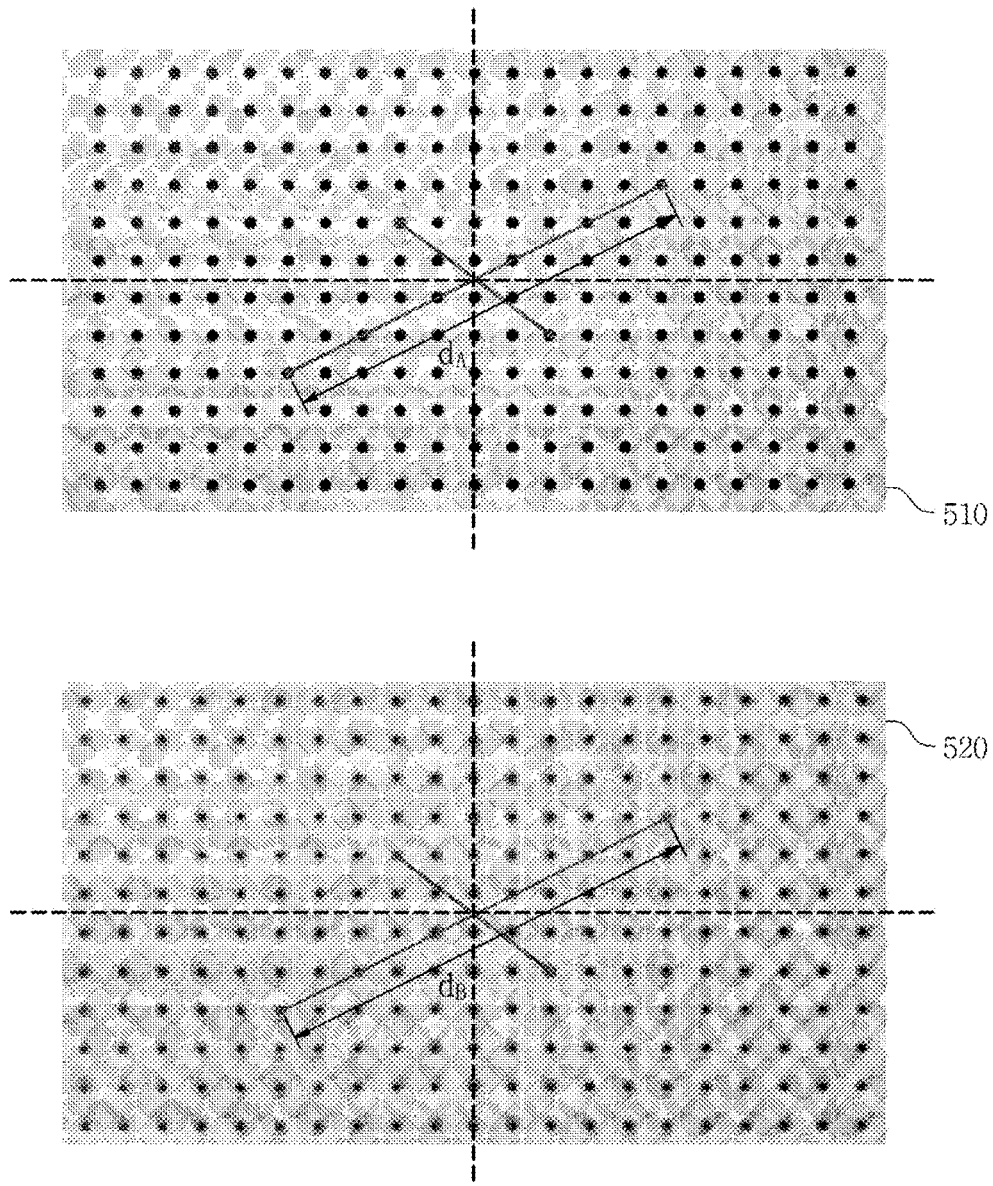
FIG. 5 illustrates a method matching the sizes of at least of two or more images according to an example embodiment.

FIG. 5 illustrates a method matching sizes of at least of two or more images according to an example embodiment.

Referring to FIG. 5, before the depth extracting unit extracts depth for the subject by using a blur difference in at least two or more images having different focused subject distances, the depth extracting unit may perform matching the sizes of the at least of two or more images having different focused subject distances based on the pre-constructed statistics of image size interpolation.

In detail, if a pattern model (a checker image model for calibration) including a specific pattern such as a dot pattern is photographed in the image sensor and two sample images 510, 520 (the two sample images including a specific pattern) having different focused subject distances are acquired, the depth extracting unit may construct statistics of image size interpolation in advance based on a distance between the dot patterns in each of the two sample images 510, 520.

For example, the depth extracting unit may calculate the rate of a distance $d_A$ (for example, a diagonal distance in an area including a pre-determined number of dot patterns based on the center of the image) between dot patterns in the first sample image 510 having a far focused subject distance and a distance $d_B$ between dot patterns in the second sample image 520 having a close focused subject distance, and may acquire a degree value for matching the size of the second sample image 520 with the size of the first sample image 510. The depth extracting unit may construct statistics of image size interpolation which is statistics of the degree value for marching the size of the second sample image 520 with the size of the first sample image 510 in advance.

Accordingly, in the case that the sizes of the at least of two or more images having different focused subject distances are different, the depth extracting unit may perform matching the sizes of the at least of two or more images having different focused subject distances based on the pre-constructed statistics of image size interpolation.

Figure 6:
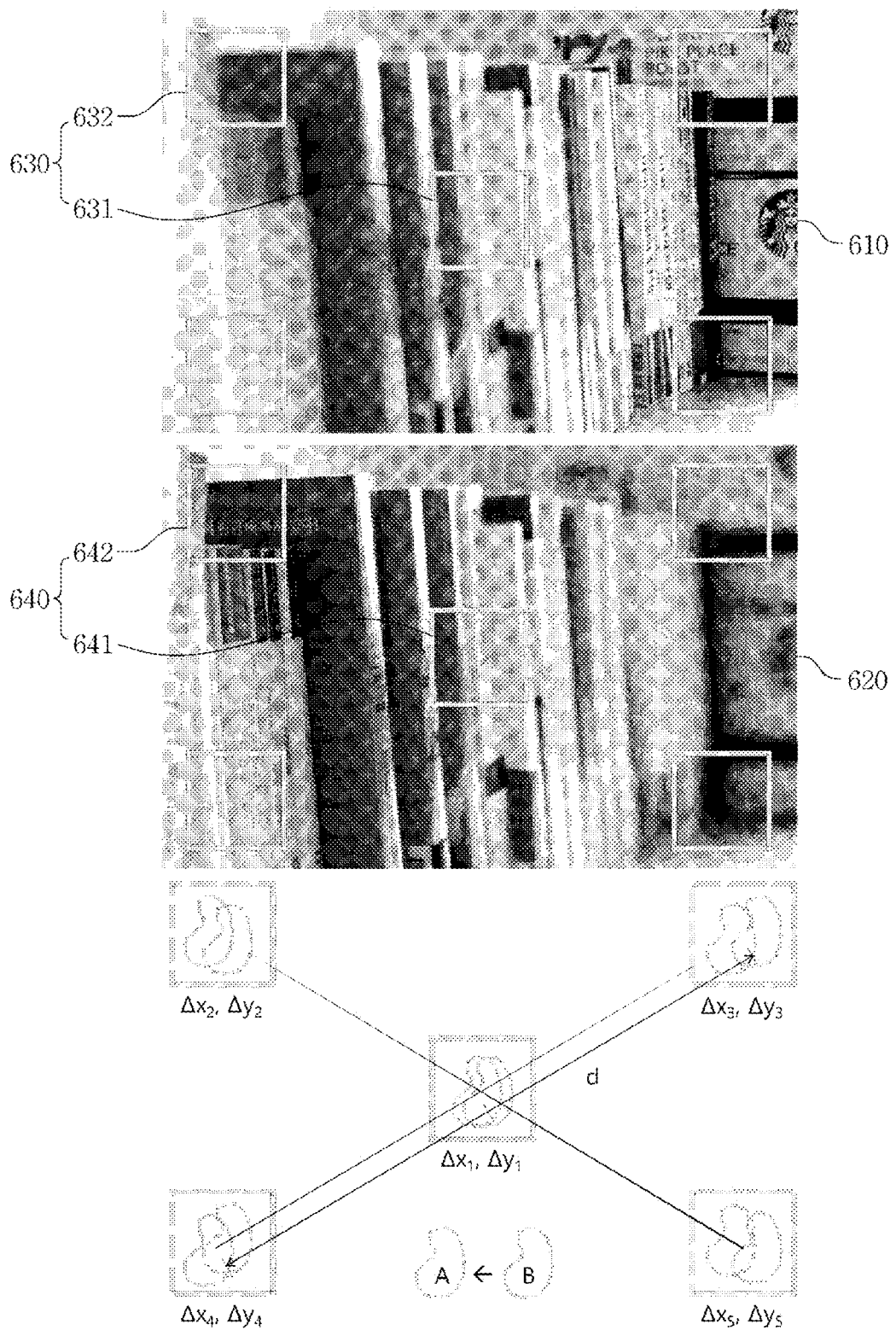
FIG. 6 illustrates a method matching sizes of at least of two or more images according to other example embodiment.

FIG. 6 illustrates a method matching sizes of at least of two or more images according to other example embodiment.

Referring to FIG. 6, before the depth extracting unit extracts depth for the subject by using a blur difference in at least two or more images 610, 620 having different focused subject distances, the depth extracting unit extracts a plurality of patches 630, 640 in each of the at least two or more images 610, 620 and may perform matching the sizes of the at least of two or more images 610, 620 having different focused subject distances based on a position shift value of each of the plurality of patches 630, 640 between the at least two or more images 610, 620. Here, although a case that the patches are plural is described as an example, a case that the patch is singular is applicable.

In detail, the depth extracting unit may extract the first plurality of patches 630 of a pre-determined number and position in the first image 610 having a far focused subject distance and the second plurality of patches 640 of a pre-determined number and position in the second image 620 having a close focused distance. Here, the first plurality of patches 630 and the second plurality of patches 640 may be set the number and position to correspond to each other in advance, and may be set to include the central area of the images 610, 620.

If the plurality of patches 630, 640 in each of the first image 610 and the second image 620 are extracted, the depth extracting unit may calculate a position shift value between the first plurality of patches 630 and the second plurality of patches 640. For example, the position shift value $(\Delta x_1, \Delta y_1)$ between the 1-1 patch 631 and the 2-1 patch 641 corresponding to the 1-1 patch and the position shift value $(\Delta x_2, \Delta y_2)$ between the 1-2 patch 632 and the 2-2 patch corresponding to the 1-2 patch may be sequentially calculated for the first plurality of patches 630 and the second plurality of patches 640.

$(\Delta x, \Delta y)$ that the first image 610 is moved based on the second image 620 may be represented based on the sequentially calculated position shift value for the first plurality of patches 630 and the second plurality of patches 640 like Equation 1 below.

$$\Delta x = \Delta x_1 = \frac{\Delta x_5 - \Delta x_2}{2} = \frac{\Delta x_3 - \Delta x_4}{2}, \quad \langle \text{Equation 1} \rangle$$
$$\Delta y = \Delta y_1 = \frac{\Delta y_5 - \Delta y_2}{2} = \frac{\Delta y_3 - \Delta y_4}{2}$$

The ratio $\rho(r)$ between the first image 610 and the second image 620 from the Equation 1 may be calculated like Equation 2 below.

$$\rho(r) = \frac{d_A}{d_B} = \frac{\sqrt{(x_{5A} - x_{2A})^2 + (y_{5A} - y_{2A})^2}}{\sqrt{(x_{5B} - x_{2B})^2 + (y_{5B} - y_{2B})^2}} = \quad \langle \text{Equation 2} \rangle$$
$$\frac{\sqrt{(x_{4A} - x_{3A})^2 + (y_{4A} - y_{3A})^2}}{\sqrt{(x_{4B} - x_{3B})^2 + (y_{4B} - y_{3B})^2}}$$

Accordingly, the depth extracting unit may perform matching the sizes of the first image 610 and the second image 620 having different focused subject distances based on the ratio $\rho(r)$ between the first image 610 and the second image 620.

Figure 7:
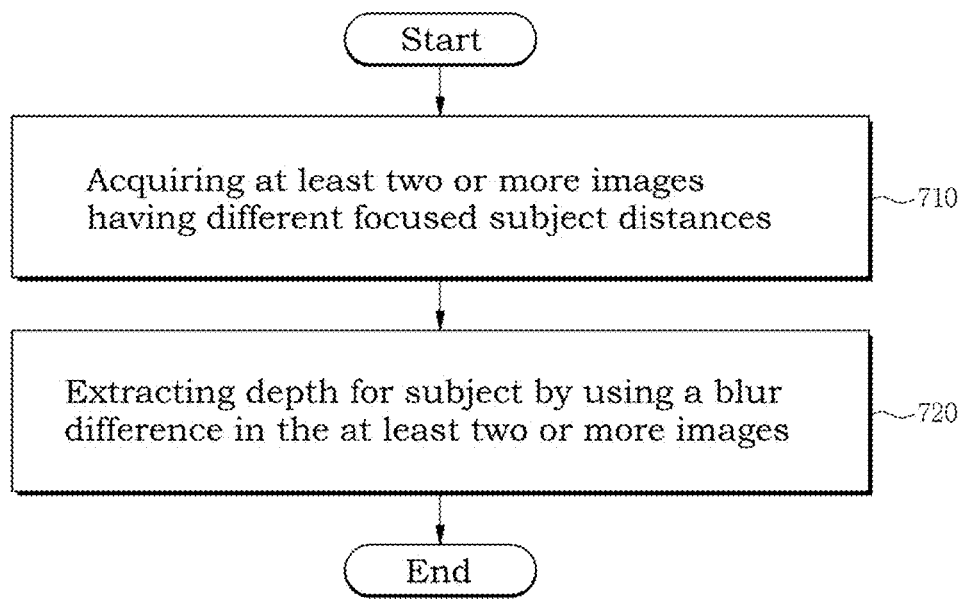
FIG. 7 is a flowchart illustrating an operation method of a depth extracting camera system according to an example embodiment.

FIG. 7 is a flowchart illustrating an operation method of a depth extracting camera system according to an example embodiment.

Referring to FIG. 7, the depth extracting camera system acquires at least two or more images having different subject distances—each of the at least two or more images including a subject—through a single optical system included in the depth extracting camera system 710.

For example, in operation 710, the depth extracting camera system may simultaneously acquire the at least two or more images having different subject distances through the single optical system consisting of MALS (Micro-mirror Array Lens System).

As another example, in operation 710, the depth extracting camera system may acquire the at least two or more images having different subject distances through the single optical system moved to a plurality of positions.

Then, the depth extracting camera system extracts depth for the subject by using a blur difference in the at least two or more images 720.

Here, in operation 720, the depth extracting camera system may extract depth for the subject by using a depth extracting algorithm calculating depth based on the ratio of a blur difference in the at least two or more images.

In particular, in operation 720, the depth extracting camera system match the sizes of the at least of two or more images, and may extract depth for the subject by using a blur difference of the at least two or more images which are matched the sizes.

For example, the depth extracting camera system acquires two sample images having different focused subject distances—each of the two sample images including specific pattern, for example, a dot pattern—through the single optical system and, by constructing statistics of the image size interpolation in advance based on a distance between specific patterns in each of the two sample images, may match the sizes of the at least two or more images based on the statistics of the image size interpolation.

As another example, the depth extracting camera system, by extracting at least one patch from each of the at least two or more images, may match the sizes of the at least two or more images based on the position shift value of the at least one patch between the at least two or more images.

Also, in operation 720, the depth extracting camera system, by selecting two images based on a correlation between the at least two or more images, may extract the depth for the subject by using a blur difference of the selected two images, or by creating two images by combining the at least two or more images, may extract the depth for the subject by using a blur difference of the created two images.

Also, the depth extracting camera system defines the focused subject distances, and may extract more accurate depth by repeating the depth extracting processes of the operations 710 to 720. Here, the depth extracting camera system may define the focused subject distance of each of the at least two or more images to be used in the present depth extracting process based on the extracted depth on the previous depth extracting process.

For example, the depth extracting camera system acquires at least two or more images having different roughly focused subject distances through the single optical system. After defining a focus range based on the rough depth for the subject by extracting the rough depth for the subject by using a blur difference of the at least two or more images having different roughly focused subject distances, the depth extracting camera system may acquire at least two or more fine images having different focused subject distances (at least two or more fine images having the farthest focused subject distance or the closest focused subject distance in the pre-defined range based on the rough depth). Accordingly, the depth extracting camera system may extract more accurate depth for the subject by using a blur difference of the at least two or more fine images.

Also, the depth extracting camera system may complete a depth map including depth for the subject for each frame by repeating depth extracting process for the subject for each of a plurality of frames as described above.

Figure 8:
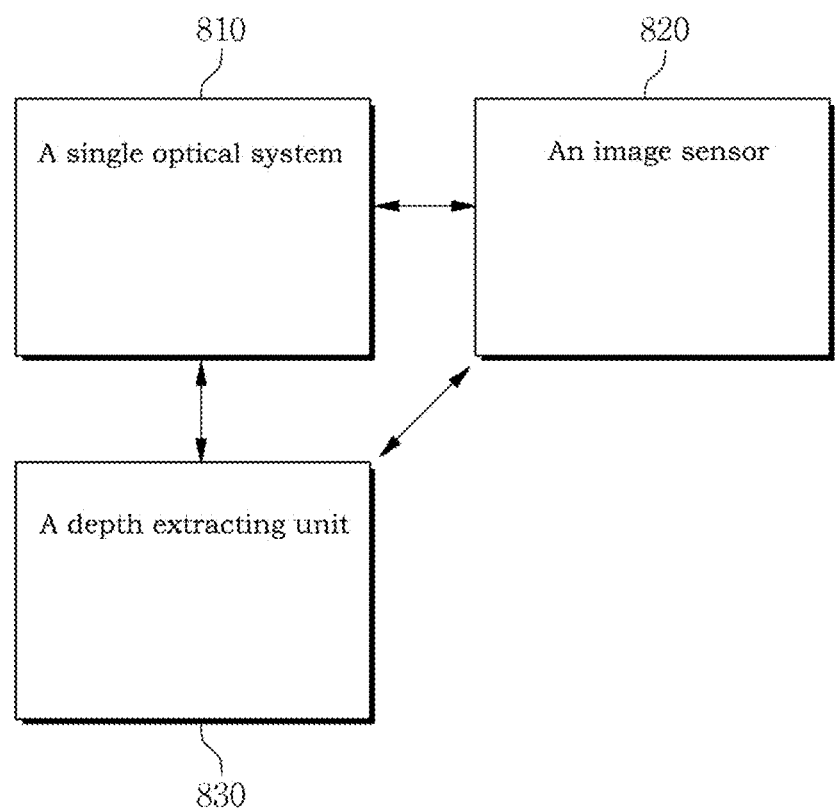
FIG. 8 is a block diagram illustrating a depth extracting camera system according to an example embodiment.

FIG. 8 is a block diagram illustrating a depth extracting camera system according to an example embodiment.

Referring to the FIG. 8, the depth extracting camera system includes a single optical system 810, an image sensor 820, and a depth extracting unit 830.

The single optical system 810 may consist of MALS (Micro-mirror Array Lens System) or may be configured to be moved to a plurality of positions.

The image sensor 820 acquires at least two or more images having different focused subject distances—each of the at least two or more images including a subject—through the single optical system 810.

For example, if the single optical system 810 consists of MALS, the image sensor 820 may simultaneously acquire the at least two or more images having the different focused subject distances depending on operation of the MALS.

As another example, if the single optical system 810 is configured to be moved to a plurality of positions, the image sensor 820 processes inflowing optical signals by the single optical system being move to the plurality of positions, and may acquire the at least two or more images having different focused subject distances.

The depth extracting unit 830 extracts depth for the subject by using a blur difference in the at least two or more images.

Here, the depth extracting unit 830 may extract the depth for the subject by using a depth extracting algorithm calculating the depth based on the rate of the blur difference in the at least two or more images.

In particular, the depth extracting unit 830, by matching the sizes of the at least two or more images, may extract the depth for the subject by using a blur difference in the at least two or more images.

For example, the depth extracting unit 830 acquires two sample images having different focused subject distances—each of the two sample images including specific pattern, for example, a dot pattern—through the single optical system 810, and by constructing statistics of the image size interpolation in advance based on a distance between specific patterns in each of the two sample images, may match the sizes of the at least of two or more images based on the statistics of the image size interpolation.

As another example, the depth extracting unit 830, by extracting at least one patch from each of the at least two or more images, may match the sizes of the at least two or more images based on a position shift value of the at least one patch between the at least two or more images.

Also, the depth extracting unit 830, by selecting two images based on a correlation between the at least two or more images, may extract the depth for the subject by using a blur difference of the selected two images, or by creating two images by combining the at least two or more images, may extract the depth for the subject by using a blur difference of the created two images.

Also, the depth extracting unit 830 defines the focused subject distances and may extract more accurate depth by repeating the depth extracting process using the single optical system 810 and the image sensor 820. Here, the depth extracting unit 830 may define the focused subject distance of each of the at least two or more images to be used in the present depth extracting process based on the extracted depth in the previous depth extracting process.

For example, if the image sensor 820 acquires at least two or more images having different roughly focused subject distances through the single optical system 810, the depth extracting unit 830 extracts the rough depth for the subject by using a blur difference of the at least two or more images having different roughly focused subject distances and defines a focus range based on the rough depth for the subject. The depth extracting unit may make the image sensor 320 acquire at least two or more fine images having different focused subject distances (at least two or more fine images having the farthest focused subject distance or the closest focused subject distance in the pre-defined range based on the rough depth). Accordingly, the depth extracting unit 830 may extract more accurate depth for the subject by using a blur difference of the at least two or more fine images.

Also, the depth extracting camera system may complete a depth map including depth for the subject for each frame by repeating depth extracting process for the subject for each of a plurality of frames depending on the operations of the single optical system 810, the image sensor 820, and the depth extracting unit 830 as described above.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An operation method of depth extracting camera system using multi focus image, the method comprising:
   acquiring a first image and second image having different roughly focused subject distances each of the first image and second image including a subject, the first image having a far subject distance that is close to infinity and the second image having a focused subject distance that is very close to the depth extracting camera system through a single optical system which is included in the depth extracting camera system;
   extracting rough depth for the subject by using a blur difference in the at least two or more images;
   defining a focus range based on the rough depth;
   extracting a fine first image and second image having different focused subject distances in the defined focus range, the fine first image having a farthest focused subject distance in the pre-defined range based on the rough depth and the fine second image having a closest focused subject distance in the pre-defined range based on the rough depth; and
   extracting fine depth for the subject by using a blur difference in the fine first image and second image.

2. A extracting depth camera system using multi focus image, the system comprising:
   a single optical system;
   an image sensor acquiring a first image and second image having different roughly focused subject distances each of the first image and second image including a subject, the first image having a far subject distance that is close to infinity and the second image having a focused subject distance that is very close to the depth extracting camera system through the single optical system; and
   a depth extracting unit configured to
   extract extracting rough depth for the subject by using a blur difference in the at least two or more images;
   define a focus range based on the rough depth;
   extract a fine first image and second image having different focused subject distances in the defined focus range, the fine first image having a farthest focused subject distance in the pre-defined range based on the rough depth and the fine second image having a closest focused subject distance in the pre-defined range based on the rough depth; and
   extract fine depth for the subject by using a blur difference in the fine first image and second image.

* * * * *